July 30, 1963     H. S. CAHEN ETAL     3,099,099

FISHING DEVICES

Filed May 29, 1961     2 Sheets-Sheet 1

INVENTORS
HERMAN S. CAHEN
& FRANK LAUER
BY
Meyer, Baldwin, Doran & Young
ATTORNEYS

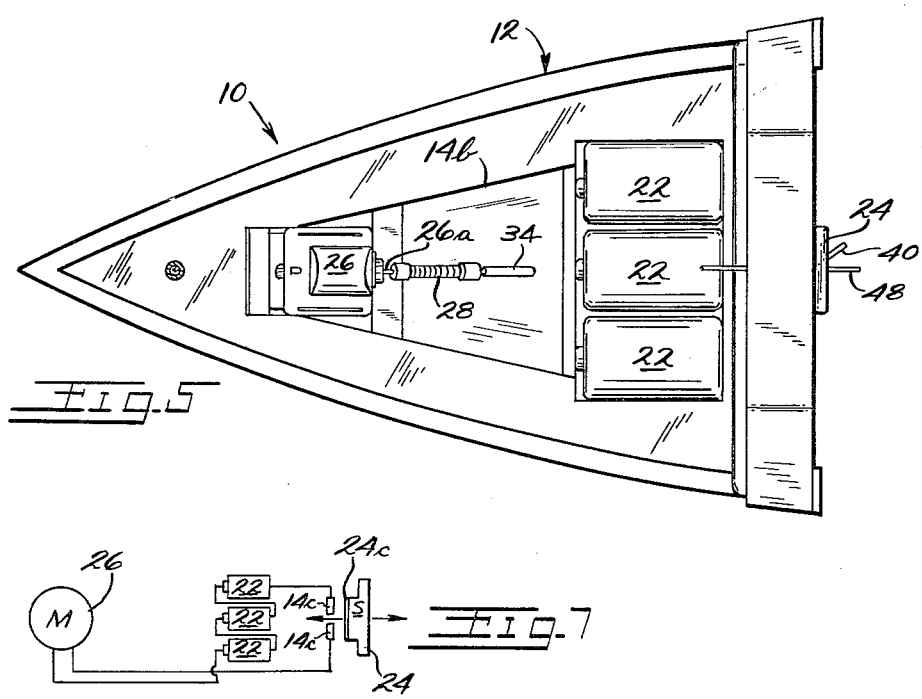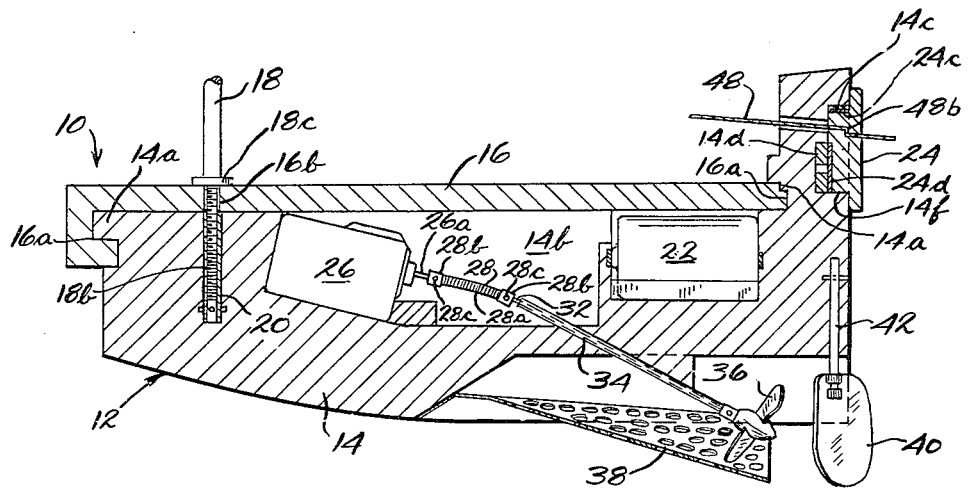

United States Patent Office 3,099,099
Patented July 30, 1963

3,099,099
FISHING DEVICES
Herman S. Cahen, 2616 University Blvd., University Heights, Ohio, and Frank Lauer, 1639 Larchmont Ave., Lakewood, Ohio
Filed May 29, 1961, Ser. No. 113,416
6 Claims. (Cl. 43—26.2)

This invention relates to fishing devices and more particularly, to a fishing device of a size which enables it to be hand held when not in use and by which a baited hook can be power propelled, for fishing purposes, through a body of water.

The invention has for its primary object the provision of a fishing device of the aforesaid nature and which is characterized by its structural simplicity, its inexpensive manufacturing and operating costs, the ease of assembly of its parts, the attractive forms in which the device may be made, and the particularly effective manner in which it performs its fishing function.

A more specific object of the present invention is the provision of a fishing device of the aforesaid character in which the movement thereof through the water is terminated upon the catching or hooking of a fish.

A further more specific object of the present invention is the provision of a power propelled fishing device of the aforesaid character in which the pulling action of a caught or hooked fish renders the power means ineffective to further propel the device through the body of water in which it has been moving.

A further more specific object of the present invention is the provision of a fishing device of the aforesaid nature which has a battery-driven electric motor for the propulsion of the device through a body of water and which is provided with a power control member adapted to be moved into power shut-off position by the pull of a caught or hooked fish.

A further more specific object of the present invention is the provision of a power propelled fishing device of the aforesaid character in which the path of travel of the device through the body of water in which it is placed is controlled by means of a manually adjustable rudder.

Further objects of the present invention, and a number of its advantages, will be referred to in or will be evident from the following description of one embodiment of the invention, as illustrated in the accompanying drawings, in which FIG. 1 is a side elevational view of the fishing device in use in a body of water for fishing purposes, the dotted line showing representing what occurs when a fish is caught and the solid line position of the lure being its trolley position;

FIG. 5 is a top plan view of the fishing device, but with the cover removed but being shown in dot-dash line position where assembled;

FIG. 6 is a vertical longitudinal sectional view of the fishing device, on the line 6—6 of FIG. 3; and FIG. 7 is a schematic illustration of the electrical circuit for the motor of the power drive.

Figure 1:
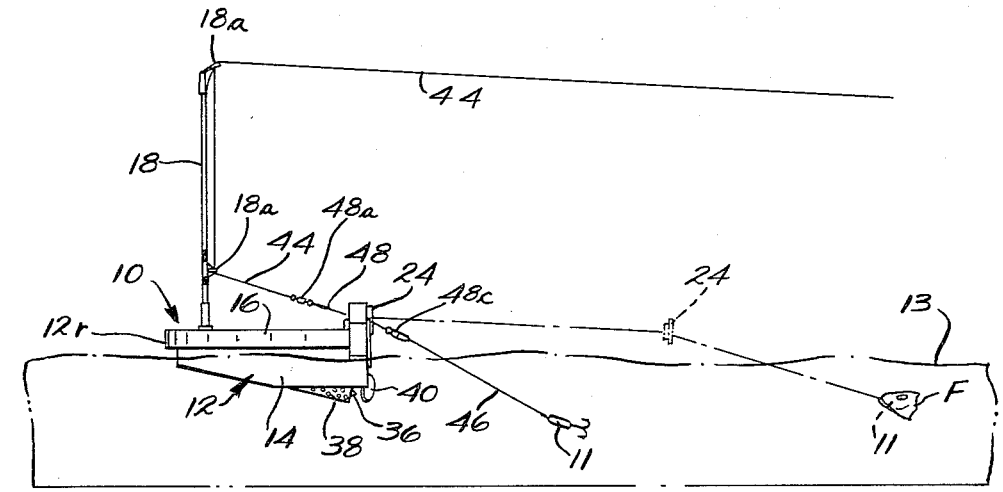
Figure 2:
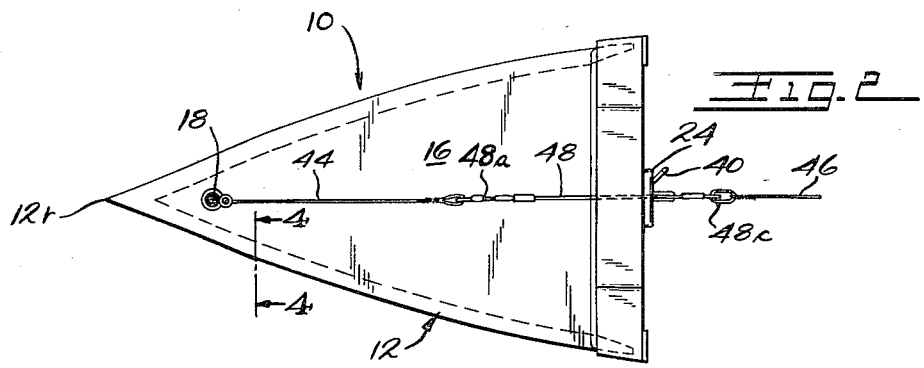
FIG. 2 is a top plan view of the fishing device.
Figure 3:
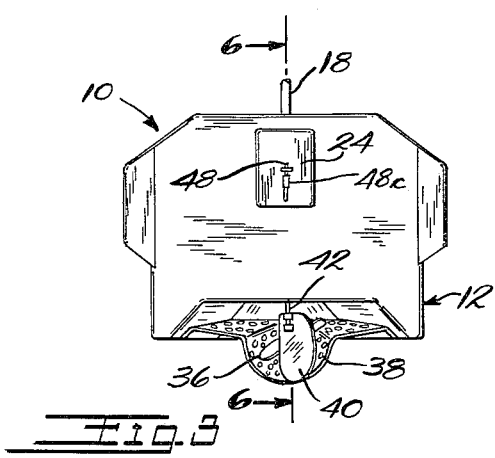
FIG. 3 is an elevation view of the rear end of the fishing device.
Figure 4:
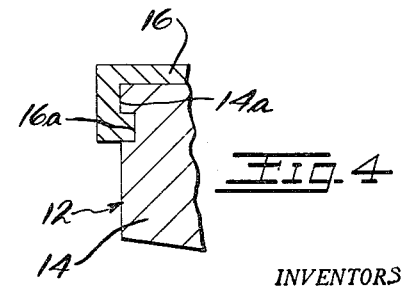
FIG. 4 is a detail vertical sectional view, on the line 4—4 of FIG. 2.

Before the fishing device here illustrated is specifically described, it is to be understood that the invention here involved is not limited to the structural details or the arrangement of parts here shown, as fishing devices embodying the present invention may take various other forms. It also is to be understood that the phraseology or terminology herein employed is for purposes of description and not of limitation, as the scope of the present invention is denoted by the appended claims.

For the disclosure of one embodiment of the present invention, there is illustrated in the accompanying drawings a fishing device 10 which includes a floating body 12 adapted to carry and to pull through a body of water 13 a fishing lure 11 of any suitable type, the device being power driven by any suitable means. As here shown, the body 12 includes a hull 14 having a detachable cover 16.

The body 12, and especially its hull 14 and cover 16, may be made in any desired shape and size. For example, it could be made in the shape of a duck, or other appropriate or attractive form, although it is here shown as being of generally boat shape. It also can be made of any suitable material, such as wood, rubber or plastic, with wood perhaps being preferable because of the ease with which it floats.

The cover 16 is here shown as being detachably connected to the hull 14 by a tongue and groove connection, the connecting parts 14a and 16a being integral, respectively, with the hull 14 and the cover 16. When the cover 16 is in the assembled position shown in FIG. 6, it is locked in place by a relatively short and substantially upright fishing rod 18. As here shown, a screw 18b on the lower end of rod 18 is inserted down through a hole 16b in cover 16 and is screwed into a threaded sleeve 20 in hull 14 until flange 18c on the rod 18 abuts against the top of the cover 16 so as to lock the cover in the position shown in FIG. 6.

Suitable power drive means is provided for propelling the present device and the lure 11 thereof through the water. In the present embodiment of the invention, three dry cell batteries 22 constituting a power source are removably mounted in a recess 14b of the hull 14. As best shown in FIG. 7, batteries 22 are connected in series with a switch plug 24 and an electric motor 26 by suitable circuit wiring, the motor 26 being controlled by switch plug 24 so that the motor is energized when said plug is seated, as in FIG. 6, in a suitable recess 14f in the hull 14. Said plug and the recess in which it is adapted to be removably sealed being of corresponding shape, such as rectangular, and of corresponding size.

When the plug 24 is in its FIG. 6 seated position, contact 24c on the top wall of plug 24 engages two horizontally spaced contacts 14c on the top edge of the wall of recess 14f in hull 14. As will be readily understood, the switch plug 24 may be removably held in its seated position in any suitable manner and by any suitable means, such as by friction, or as in the present instance, by making one of the plates 14d and 24d, respectively secured to hull 14 and plug 24, a permanent magnet and the other of magnetic material so that magnetic attraction will detachably hold switch plug 24 in seated position in its recess 14f.

Electric motor 26 has its output shaft 26a secured by a flexible coupling 28 to one end of a propellor shaft 32 which has a propeller 36 on its other end, the shaft being rotatably mounted in a stationary bearing sleeve 34 carried by the hull 14. Flexible coupling 28 includes a helical spring 28a having coupling sleeves 28b secured in any suitable manner to each of its opposite ends. A clamp screw 28c secures coupling 28 to motor shaft 26a and propeller shaft 32 for transmitting the driving torque of motor 26 to the propeller 36 to propel body 12 through the water, the forward end 12r being the bow of the boat-shaped body.

The connection between the driving motor 26 and the propeller 36 may be so constructed and arranged (as to the flexible coupling 28 or otherwise) to obtain any desired noise level. Some fishermen may prefer a quiet operating drive but others may want one with some noise, perhaps even substantial noise, in the belief that noise attracts fish. Therefore, the driving connection between the motor 26 and the propeller 36, or if desired, some other part of the device, may be of such character as to produce any desired amount of noise.

Preferably and as here shown, a perforated metal guard 38 is secured to the bottom surface of hull 14 to protect the propeller 36 from damage by weed or ground contact. The perforations of the guard enable water to readily pass therethrough and thereby permit proper driving action by the propeller.

A steering rudder 40 is secured to a pin 42, which has a tight frictional fit in the hull 14, so that the rudder may be manually turned and frictionally held in any adjusted position for power travel of body 12 in any desired path or direction in the body of water in which the body is placed in use of the present device.

The fishing device 10 is easily assembled, as follows: After batteries 22 have been placed in position between their end contacts on hull 14, cover 16 is slid horizontally toward the right to the FIG. 6 position on hull 14 to interlock connecting parts 14a, 16. Cover 16 is then securely locked in place by inserting fishing rod screw 18b down through cover hole 16b and screwing it into the threaded sleeve 20. A fishing line 44 is threaded downwardly through eyes 18a on the fishing rod 18 and then its lower end is secured to an eye 48a on one end of a wire or other suitable leader 48, which is fixedly secured as at 48b, to the switch plug 24, the other end of the line 44 being grasped by, or otherwise under the control of, the fisherman.

A short line 46, of wire or other suitable material, is secured at one end (the left end in FIG. 1) to the eye 48c of the leader 48 (the eyes of said leader being preferably of the usual swivel type), and the other end of said line has suitably secured thereto the lure 11, the line 46 being of sufficient length to locate the lure at the desired depth in the water in which the present device is placed in use thereof.

The device is placed in operating condition, as follows: The rudder 40 is manually turned about its vertical axis, FIG. 6, to suitably orient it so as to cause the device to take any desired path or course of travel in the water to be fished. This may be a circular path, of any desired radius, adjacent a pier upon which the fisherman is located or around the fisherman's boat, or it may be a straight course of travel parallel or substantially parallel to the shore along which the fisherman walks.

After the rudder is so adjusted, the switch plug 24 is inserted into the body recess 14f to close contacts 14c and 24c and thereby energize motor 26 for propelling the device through the body of water to be fished. As heretofore mentioned, the magnetic attraction between plates 14d and 24d detachably holds the plug 24, and the leader 48 fixed thereto, in said recess 14f.

Upon being placed in the body of water to be fished, the device is propelled therein along the selected path of travel, with the lure 11 being pulled along in the well known trolling manner.

When a fish F (FIG. 1) is hooked, the pull thereof will withdraw the switch plug 24 from its recess 14f, with consequent breaking of the contacts 14c and 24c and resulting de-energization of the motor 26 and the stopping of the propeller 36. The fisherman thereupon becomes aware of the hooking of a fish, and the device and the fish are pulled to him by means of the fishing line 44.

Upon releasing the fish, the switch plug can be reinserted into its recess 14f and the device returned to the water for a further fishing operation.

To those skilled in the art to which the present invention relates, other features and advantages of the present invention will be evident from the foregoing description of one embodiment of the invention.

What is claimed is:

1. A fishing device which in use is caused to move over the surface of a body of water, said device comprising a floating body, power means for causing said floating body to move over the surface of said body of water, control means for said power means, and a fishing line provided with a lure for movement in said body of water and which fishing line is operatively connected with said control means so that when a pull is exerted on said line, such as would be exerted by a caught fish, the control means is operated to cause said power means to discontinue the movement of the floating body over the surface of the body of water.

2. A fishing device which in use is caused to move over a body of water, said device comprising a floating body, power means capable of causing said floating body to move over the surface of said body of water, said power means including an electric circuit having a detachable plug as a part thereof, the detachment of said plug effecting an interruption of the circuit and thereby rendering the power means ineffective to cause the floating body to move over the surface of said body of water, and a fishing line operatively connected with said plug and having a lure attached thereto for disposition in said body of water, said fishing line being capable of detaching said plug when a pull is exerted on said line, such as the pull which would be exerted on said line by a caught fish.

3. A fishing device which in use is caused to move over the surface of a body of water, said device comprising a floating body, power means for causing said floating body to move over the surface of said body of water, control means for said power means, a fishing line operatively connected with said control means, one end of said fishing line being adapted to be held by or otherwise being under the control of the fisherman and the other and free end of said line being provided with a lure for movement in said body of water, said fishing line being effective on said control means when a pull is exerted on that section of the line which is between said control means and said lure, such as would be exerted by a caught fish, to cause said power means to discontinue the movement of the floating body over the surface of the body of water.

4. A fishing device which in use is caused to move over the surface of a body of water, said device comprising a floating body, a propeller carried by said floating body for disposition in said body of water, a power unit carried by said floating body for operating said propeller to thereby cause said floating body to move over the surface of said body of water, a plug-type control for said power unit movable into and out of propeller-actuating position, means for releasably maintaining said plug-type control in propeller-actuating position, and a fishing line operatively connected with said plug-type control and being provided with a fishing lure for disposition in said body of water, said plug-type control being movable out of said propeller-operating position by a pull on said fishing line, such as that exerted by a caught fish, with consequent termination of the movement of the floating body over the surface of said body of water.

5. A fishing device which in use is caused to move over the surface of a body of water, said device comprising a floating body, a propeller carried by said floating body for disposition in said body of water, a power unit carried by said floating body for operating said propeller to thereby cause said floating body to move over the surface of said body of water, an adjustable rudder carried by said floating body to control the direction of movement thereof in said body of water, a plug-type control for said power unit movable into and out of propeller actuating position, and a fishing line operatively connected with said plug-type control and being provided with a fishing lure for disposition in said body of water, said plug-type control being movable out of said propeller-operating position by a pull on said fishing line, such as that exerted by a caught fish, with consequent termination of the movement of the floating body over the surface of said body of water.

6. A fishing device which in use is caused to move over the surface of a body of water, said device comprising a floating body, a propeller carried by said floating body for disposition in said body of water, a power unit carried by said floating body for operating said propeller to thereby cause said floating body to move over the surface of said body of water, a plug-type control for said power unit movable into and out of propeller-actuating position, magnetic means for releasably maintaining said plug-type control in propeller-actuating position, and a fishing line operatively connected with said plug-type control and being provided with a fishing lure for disposition in said body of water, said plug-type control being movable out of said propeller-operating position by a pull on said fishing line, such as that exerted by a caught fish, with consequent termination of the movement of the floating body over the surface of said body of water.

References Cited in the file of this patent

UNITED STATES PATENTS

| | | |
|---|---|---|
| 2,693,047 | Lumsden | Nov. 2, 1954 |
| 2,709,316 | McCabe | May 31, 1955 |
| 2,726,471 | Uus | Dec. 13, 1955 |
| 2,803,914 | Ellis | Aug. 27, 1957 |
| 2,804,712 | Jackson | Sept. 3, 1957 |